Patented Dec. 6, 1938

2,139,000

UNITED STATES PATENT OFFICE 2,139,000

SOLVENT EXTRACTION OF OLEFINES AND DIOLEFINES FROM PETROLEUM

Charles A. Cohen, Elizabeth, N. J., assignor to Standard Oil Development Company, a corporation of Delaware No Drawing. Application March 27, 1934, Serial No. 717,573

9 Claims. (Cl. 260—170)

This invention relates to improvements in the manufacture and production of valuable products from petroleum hydrocarbons and relates particularly to a process of treating with solvents, distillates obtained from the products formed by cracking petroleum hydrocarbons.

The petroleum distillates obtained from the products formed by vapor phase and liquid phase cracking of petroleum hydrocarbons contain saturated and unsaturated compounds together with hydrogen. Neither type of cracking is conducted at a temperature in excess of 1200° F. In such processes the gases produced are usually free from acetylene hydrocarbons. With certain stocks acetylene hydrocarbons may be formed in negligible amounts, scarcely ever more than 1% by volume. Two series of unsaturated compounds are found present in substantial quantities, i. e., olefines and diolefines. The diolefines readily polymerize and form gums and therefore are generally removed before the distillates are marketed. The percentage of diolefines present varies from about 1% in products formed by liquid phase cracking to about 10% in products formed by vapor phase cracking. The diolefines heretofore have been removed by treating with sulfuric acid, clay, or solvents such as phenol, sulfur dioxide, furfurol, etc. This treatment removed both the diolefines and olefines, both of which have usually been discarded as waste or used as fuel.

According to the present invention, the diolefines and a fraction of the olefines are removed from the petroleum distillates by the use of solvents, recovered and used in the preparation of valuable products by polymerizing with the aid of a metallic halide or other catalysts to produce synthetic resins, oils, thickeners, lubricants, drying oils, and the like.

An object of this invention is to provide a process for solvent treating the petroleum distillates formed by cracking petroleum hydrocarbons so that more valuable products are prepared both from the extracted material and the extract.

This and other objects of the invention will be readily understood by the following illustration:

Esters of inorganic acids, for example, alkyl nitrites such as amyl nitrite in methyl alcohol, dialkyl sulfates such as dimethyl, diethyl or di-isopropyl sulfate, and other esters such as benzyl cyanide, butyl nitrate, benzyl sulfate, creosote carbonate, diethyl carbonate, tricresyl phosphate, allyl sulfocyanide, ethyl borate, ethyl chlorcarbonate, methyl hypochlorite, propyl isocyanate, ethyl ortho-silicate, ethyl selenide, ethyl sulfoxide, methyl hydrogen sulfate, ethyl thiocarbonate, etc. are found suitable for extracting a mixture of olefines and diolefines from cracked petroleum distillates. These organic solvents are used to separate the olefines and diolefines, for example, by contacting with a cracked petroleum distillate. One or more of the above solvents are shaken with the cracked petroleum distillate, or otherwise brought into intimate contact with it, the resulting mixture is allowed to settle and stratify and the solvent layer withdrawn. The olefines and diolefines dissolved in the solvent are then separated from the solvent by heating, dilution, or the like. When gaseous mixtures containing unsaturated compounds are to be treated, the olefines and diolefines may be dissolved in the solvents by bubbling the gaseous mixture through one or more bodies of the organic solvents. The olefines and diolefines are then expelled from the organic solvents by the application of heat and segregated. The quantity of solvent used is from 0.1 of a pound of solvent for each pound of raw material extracted, to 10 or 20 pounds or more of solvent for each pound of extracted material. The preferred ratio is 1 to 3 pounds of the solvent for each pound of the extracted material. The contacting of the organic solvents and the cracked petroleum distillates may be made at temperatures from —30° to 100° C., preferably at room temperature, though the lower temperatures are desirable when treating gaseous mixtures. Atmospheric pressures may be used, though higher pressures are desirable when gaseous olefines and diolefines are being recovered to maintain the extract in the liquid phase. A countercurrent method of treating may also be used such as by passing the product into an intermediate part of an absorber, passing the solvent into the upper portion of the absorber and a volatile saturated hydrocarbon such as propane, butane, hexane, etc. into the lower part of the absorber. The solvent, on coming in contact with the petroleum distillate, mechanically holds in suspension a fraction of saturated hydrocarbons. It is desirable to remove these saturated hydrocarbons from the solvent and this is done by passing an inert gas, such as a volatile saturated hydrocarbon, e. g. propane, through the solvent. The method of treating may be either batch or continuous.

The separated mixture of olefines and diolefines may then be contacted with a metallic halide such as anhydrous aluminum chloride or boron fluoride. Suitable cooling means are provided as the reaction is a rapid one with the evolution of heat. The reaction is controlled by adding the metallic halide slowly to the mixture of olefines and diolefines. A resin is formed whose carbon-hydrogen ratio varies with the amount of olefine present. The amount of olefine present governs the hardness of the resin formed as where more olefines are present a softer resin is produced. The diolefines present in the extracted mixture may be further separated from the olefines by means of substances such as maleic anhydride or cuprous chloride with ammonium chloride, and used in the preparation of resins.

The specified esters of inorganic acids extract at least 50% of the diolefines present, for example, on contacting dimethyl sulfate with a gasoline solution containing 1% of pentene and 1% of isoprene, 41% of the pentene and 59% of the isoprene present were removed.

Mixtures of the above solvents may also be used to obtain a mixture of olefines and diolefines of the desired proportions.

The foregoing description is merely illustrative and alternative arrangement may be made within the scope of the appended claims in which it is my intention to claim all novelty as broadly as the prior art permits.

I claim:

1. A process for the separation of olefines and diolefines from other hydrocarbons in a mixture substantially free from hydrocarbons of the acetylene series, which comprises the contacting of such a mixture with an ester of an inorganic oxygen-containing acid, separating the solvent, and recovering the olefines and diolefines from the separated solvent.

2. A process for the separation of olefines and diolefines from other hydrocarbons in a mixture substantially free from hydrocarbons of the acetylene series according to claim 1, in which the mixture of olefines and diolefines is recovered from the ester of an inorganic acid by heat.

3. A process for the separation of a mixture of olefines and diolefines in desired ratio for condensation reactions from other hydrocarbons in a gaseous mixture substantially free from hydrocarbons of the acetylene series which comprises contacting such a gaseous mixture with a liquid ester of an inorganic oxygen-containing acid, separating the solvent, and recovering the olefines and diolefines from the separated solvent.

4. A process for the separation of olefines and diolefines in definite proportion for condensation reactions from other liquid hydrocarbons in a mixture substantially free from hydrocarbons of the acetylene series, which comprises contacting such a liquid mixture with a liquid ester of an inorganic oxygen-containing acid, settling the liquids into layers, separating the solvent layer, separating the diolefines from the separated ester of an inorganic acid by heating and condensing the diolefines.

5. A process for the separation of olefines and diolefines in desired proportion for condensation reactions from a mixture produced by vapor phase cracking of petroleum hydrocarbons and substantially free from hydrocarbons of the acetylene series, which consists of contacting said mixture with a liquid ester of an inorganic acid, separating the organic oxygen-containing solvent, and separating the olefines and diolefines from the organic solvent.

6. A process for separation of olefines and diolefines of a desired proportion from a mixture produced by vapor phase cracking of petroleum hydrocarbons according to claim 5, in which the ester used is an alkyl nitrite.

7. A process for separation of olefines and diolefines of a desired proportion from a mixture produced by vapor phase cracking of petroleum hydrocarbons according to claim 5, in which the ester used is a dialkyl sulfate.

8. A process for extracting olefines from a hydrocarbon mixture containing them and substantially free from hydrocarbons of the acetylene series which comprises contacting the hydrocarbon mixture with a sufficient amount of an ester of an inorganic oxygen-containing acid to dissolve the olefinic content of said mixture.

9. The process according to claim 8 in which the ester employed is an alkyl ester.

CHARLES A. COHEN.